United States Patent
Farmer, III

(10) Patent No.: US 10,609,070 B1
(45) Date of Patent: Mar. 31, 2020

(54) DEVICE BASED USER AUTHENTICATION

(71) Applicant: Claude M. Farmer, III, Auburn, WA (US)

(72) Inventor: Claude M. Farmer, III, Auburn, WA (US)

(73) Assignee: Claude W. Farmer, III, Auburn, WA (US)

( * ) Notice: Subject to any disclaimer, the term of this patent is extended or adjusted under 35 U.S.C. 154(b) by 256 days.

(21) Appl. No.: 15/454,512

(22) Filed: Mar. 9, 2017

Related U.S. Application Data

(60) Provisional application No. 62/306,169, filed on Mar. 10, 2016.

(51) Int. Cl.
   *H04L 29/06* (2006.01)

(52) U.S. Cl.
   CPC .......... *H04L 63/1466* (2013.01); *H04L 63/06* (2013.01); *H04L 63/083* (2013.01); *H04L 63/0823* (2013.01); *H04L 63/10* (2013.01); *H04L 2463/082* (2013.01)

(58) Field of Classification Search
   CPC .............................. H04L 29/06; H04L 63/1466
   See application file for complete search history.

(56) References Cited

U.S. PATENT DOCUMENTS

| | | | | |
|---|---|---|---|---|
| 9,363,232 | B1* | 6/2016 | Adams | H04L 63/02 |
| 9,992,029 | B1* | 6/2018 | Jackson | H04L 9/3268 |
| 2006/0143700 | A1* | 6/2006 | Herrmann | H04L 63/0823 726/14 |
| 2007/0234409 | A1* | 10/2007 | Eisen | H04L 63/0876 726/6 |
| 2010/0306533 | A1* | 12/2010 | Phatak | G06F 21/34 713/156 |
| 2015/0180869 | A1* | 6/2015 | Verma | H04L 63/0838 726/4 |

* cited by examiner

*Primary Examiner* — William S Powers

(57) ABSTRACT

Methods and systems provide network security by associating login credentials with a specific end-point. By doing so, valid user login credentials are not recognized when not used on a device authorized to use those credentials. By creating that association in a secure manner, the protection of confidential information becomes more complete and the leakage or theft of data such as usernames and passwords becomes less critical. Additionally, creating this hard association makes hacking tools such as password crackers and rainbow tables significantly less effective since the possession of a valid username/password is no longer sufficient for bad actors to access assets using this two-factor authentication model.

3 Claims, 9 Drawing Sheets

DEVICE BASED USER AUTHENTICATION

CROSS-REFERENCES

This application claims the benefit of U.S. Provisional Patent Application 62/306,169 filed on Mar. 10, 2016 for "Device Based User Authentication," which application is incorporated herein in its entirety for all purposes.

FIELD

This disclosure relates to computer-based security systems. More specifically, disclosed embodiments relate to securing of user credentials to a client device.

INTRODUCTION

User authentication is divided into 2 types: one-factor and two-factor. One-factor authentication is the common username and password combination. It is summarized by what you know. Two-factor authentication is what you know and what you have. A common implementation for consumer sites is the username/password combined with a cellular phone that is capable of receiving SMS messages for secondary authentication.

Two-factor authentication (2 FA) is becoming more prevalent with multiple instantiations ranging from the aforementioned text message to encrypted USB devices and Bluetooth enabled fobs.

In each of these models, there is a unique two-factor authentication service which requires user-intervention and does not provide a unified set of detection and notification tools for stolen credentials. Additionally, this two-factor authentication does not make a hard association of user credentials to specific devices allowing the theft of the knowledge (credentials), and second-factor (cell phone) to be sufficient in attempting an unauthorized intrusion.

SUMMARY

In some embodiments, a method of preventing the use of stolen or lost Web-based service credentials may include hosting by a host computer device on a computer network a unique session of an application using a Web-based service and running on a user computer device; creating a unique session id for each connection attempt by a user on a user computer device included in a computer network; receiving from a user on the user computer device a username and password; authenticating the user in an authentication system; requesting, on the server of an Internet-based authentication service provider, access to a central authority authorized to validate the authentication of the user by the received username from the host computer device; generating an algorithm for a unique combination of unique, rotating seeds and certificates selected from a database of seeds and certificates stored on a web-based data base at the central authority; delivering the algorithm to the user computer device; generating a validation token on the user computer device using the delivered algorithm; sending the validation token to the central authority for confirmation; determining by the central authority whether or not the generated validation token is correct; notifying by the central authority the Web-based service as to whether the authentication attempt is valid or invalid; updating, by the central authority, a key or set of keys on the user computer device from a set of unique, rotating keys stored on the user computer device; and denying access by the user computer device access to the Web-based service if the authentication attempt is invalid.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

In the drawings, like reference characters generally refer to the same parts throughout the different views. Also, the drawings are not necessarily to scale, emphasis instead generally being placed upon illustrating principles of the embodiments.

DESCRIPTION

Figure 1:
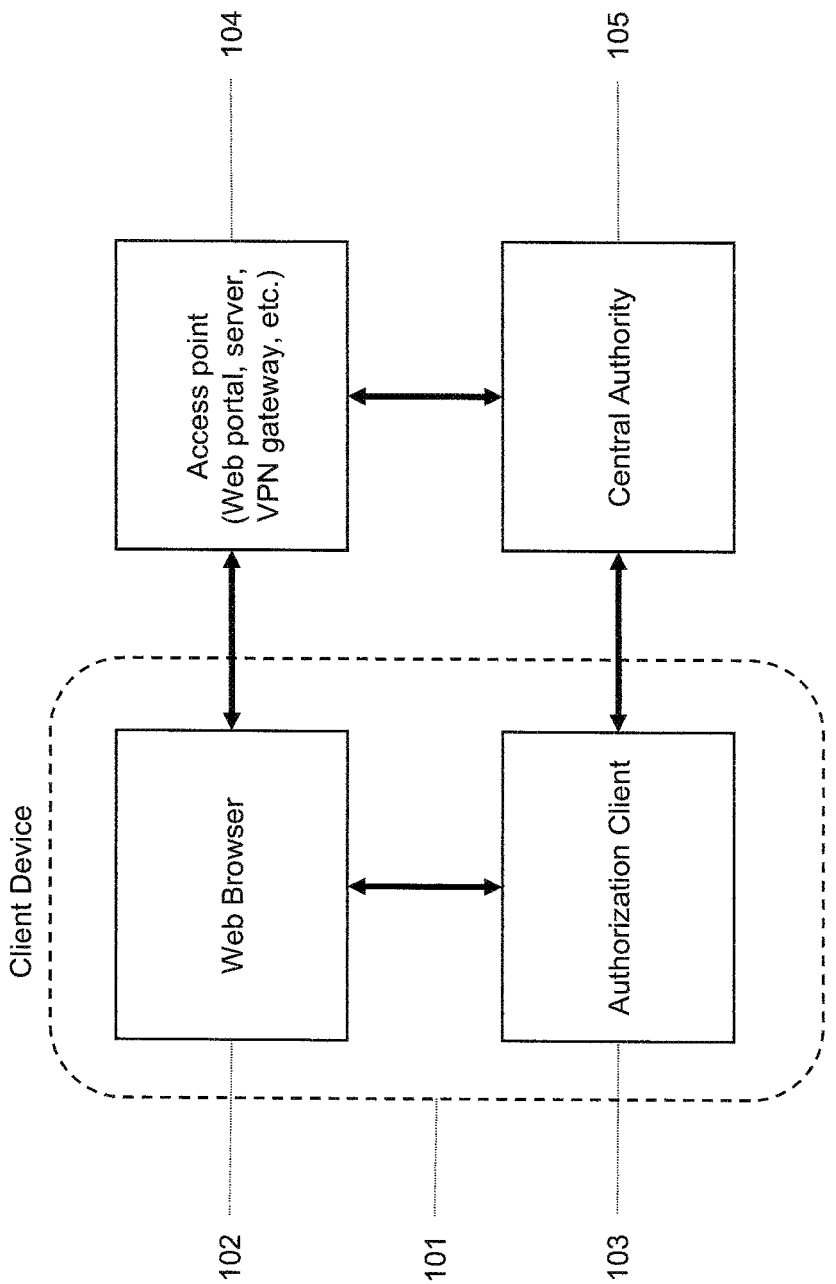
FIG. 1 is a block diagram of an embodiment of a system providing device based user authentication.

Various embodiments of methods and systems providing device based user authentication are described below and illustrated in the associated drawings. Unless otherwise specified, the system and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other similar systems. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Methods and systems provide network security by associating login credentials with a specific end-point. By doing so, valid user login credentials are not recognized when not used on a device authorized to use those credentials. By creating that association in a secure manner, the protection of confidential information becomes more complete and the leakage or theft of data such as usernames and passwords becomes less critical. Additionally, creating this hard association makes hacking tools such as password crackers and rainbow tables significantly less effective since the possession of a valid username/password is no longer sufficient for bad actors to access assets using this two-factor authentication model.

Aspects of device based user authentication may be embodied as a computer method, computer system, or computer program product. Accordingly, aspects of device based user authentication may take the form of an entirely hardware embodiment, a software embodiment (including firmware, resident software, micro-code, and the like) configured on a computer, or an embodiment combining software and hardware aspects, all of which may generally be referred to herein as a "circuit," "module," or "system." Furthermore, aspects of device based user authentication may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of device based user authentication may be written in one or any combination of programming languages, including an object-oriented programming language such as Java, Smalltalk, C++, and/or the like, and conventional procedural programming languages, such as the C programming language. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of device based user authentication are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block or blocks.

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block or blocks.

Any flowchart and/or block diagram in the drawings is intended to illustrate the architecture, functionality, and/or operation of possible implementations of systems, methods, and computer program products according to aspects of device based user authentication. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

The following sections describe selected aspects of exemplary embodiments of device based user authentication as well as related systems and/or methods. The examples in these sections are intended for illustration and should not be interpreted as limiting the entire scope of the present disclosure. Each section may include one or more distinct inventions, and/or contextual or related information, function, and/or structure.

Referring to FIG. 1, The architecture described in FIG. 1 is a multi-client/multi-server architecture with the authorization client, web service, and central authority all acting as a server in various roles. Additionally, both the authorization client and web service also act as clients to the central authority.

In FIG. 1 the Client Device 101 contains the web browser 102 and authorization client 103. This client device 101 is typically a laptop, desktop, server, or mobile device such as a tablet or mobile phone. The web browser 102 contained on the client device 101 is a standard web browser. The authorization client 103 is a software module which provides second factor authentication. The web service 104 is any internet enabled web application requiring a username/password authentication. The central authority 105 is an independent third-party system which will maintain records appropriate to the web service 104, anonymized user information, and seed records. The primary function of the central authority 105 is to perform the second factor authentication in conjunction with the web service 102 and the authorization client 103.

Figure 2:
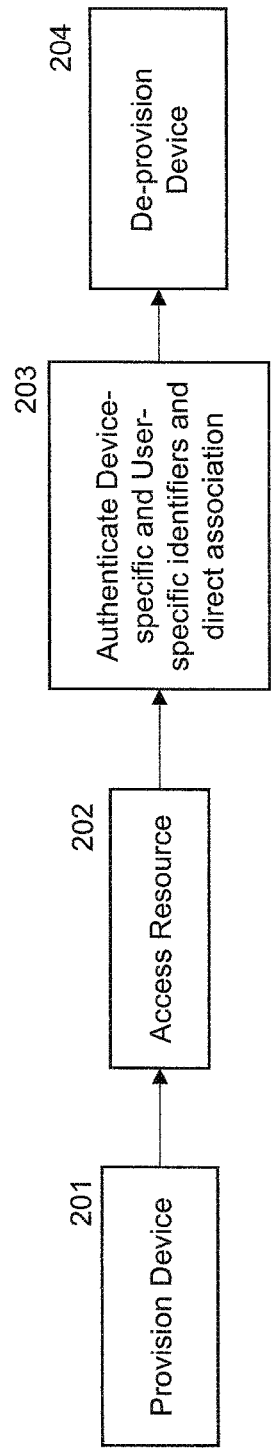
FIG. 2 is a block diagram of an embodiment of a lifecycle of a device.

Referring to FIG. 2, an embodiment of the function flow for the life-cycle of a client device 101 in the secured network is illustrated. The states described indicate where a device is in its participation lifecycle with the secured network.

Figure 6:
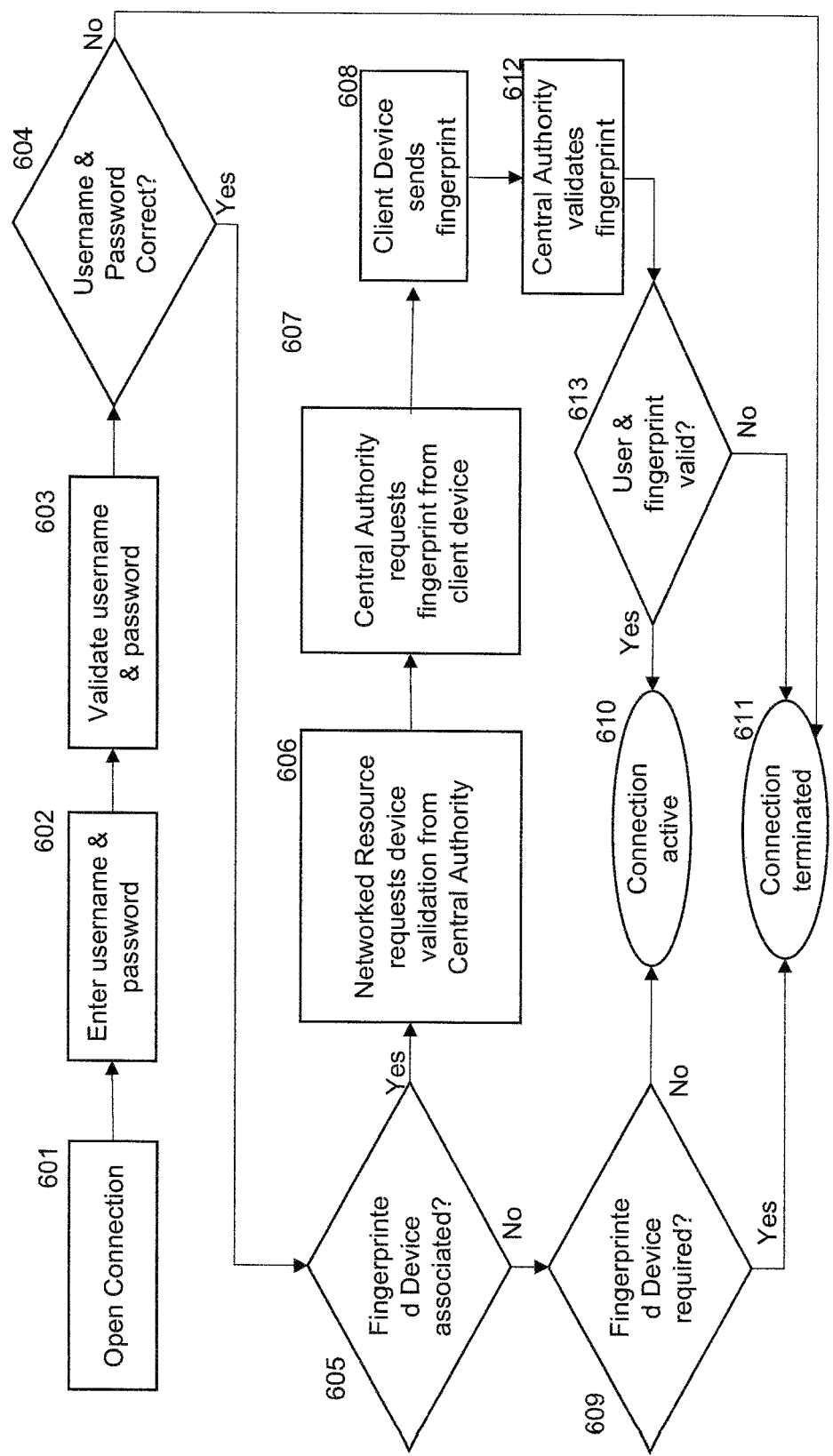
FIG. 6 is an illustration of operations performed by one embodiment of an authentication model where a user and an associated device are authenticated.

The four states are: provisioning 201 is where the client device 101 is enabled to use the fingerprint FIG. 2 methods for network access, accessing 202 is where the device attempts to access a network resource 102, authenticating 203 is the state where the client device 101 is employing the embedded two-factor authentication illustrated in FIG. 6 to successfully connect to the resource 103, and de-provisioning 204 is where a client device 101 is being disabled from accessing the secured resource 103 by removal of a key, fingerprint, or other identifier.

First, a client device 101 is provisioned with the installation of a authorization client 103. During this provisioning operation FIG. 4/FIG. 5, an entry is created in the Central Authority 105 associating the username with a specific set of seeds by creating public/private key pair in the Central Authority 105. The public key is sent to the device, the fingerprint 302 is generated and encrypted 303 on the client device 101, and the encrypted fingerprint 304 is sent to the Central Authority 105 where it is decrypted with the private key associated with the user. That information is stored on the Central Authority 105. At this point, a client device 101 has been modified to access this instance of a secured network 104 with the associated username.

When a resource 104, such as a Web Page, the resource prompts for the username and password 602, validates that combination 604, and queries the Central Authority 105 for a device association 605. If there is no device association for that username, the login can proceed unless the system is set to only allow provisioned connections 609 in which case the connection fails. If a device association is found 606, the client device is then queried 607 for its public-key encrypted fingerprint 302. That fingerprint is then validated against the fingerprint found on the Central Authority using the private key associated with that username 608. If the device is found the connection is established 610. If not, it is terminated 611.

Figure 7:
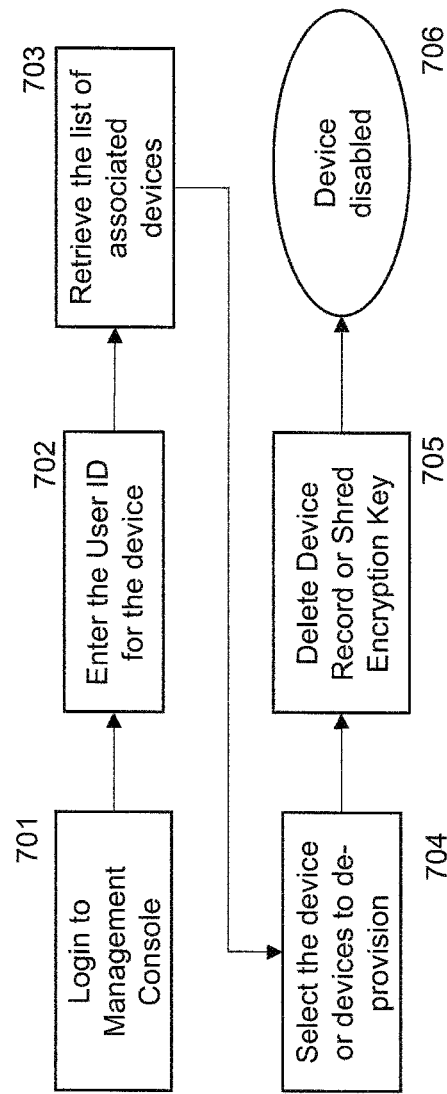
FIG. 7 is an illustration of operations performed by one embodiment of a de-provisioning model where a user(s) and/or a device(s) is/are disabled.

A client device 101 may be de-provisioned FIG. 7 at any point in its lifecycle either because it was lost or the user has cancelled use. At the end of the lifecycle, the Central Authority 105 shreds or removes the private key and seeds for the user enabled on the specific client device. At this point, if a user has no device associations active and the network is configured to allow unassociated connections, they may still successfully connect with a valid username/password combination.

Figure 3:
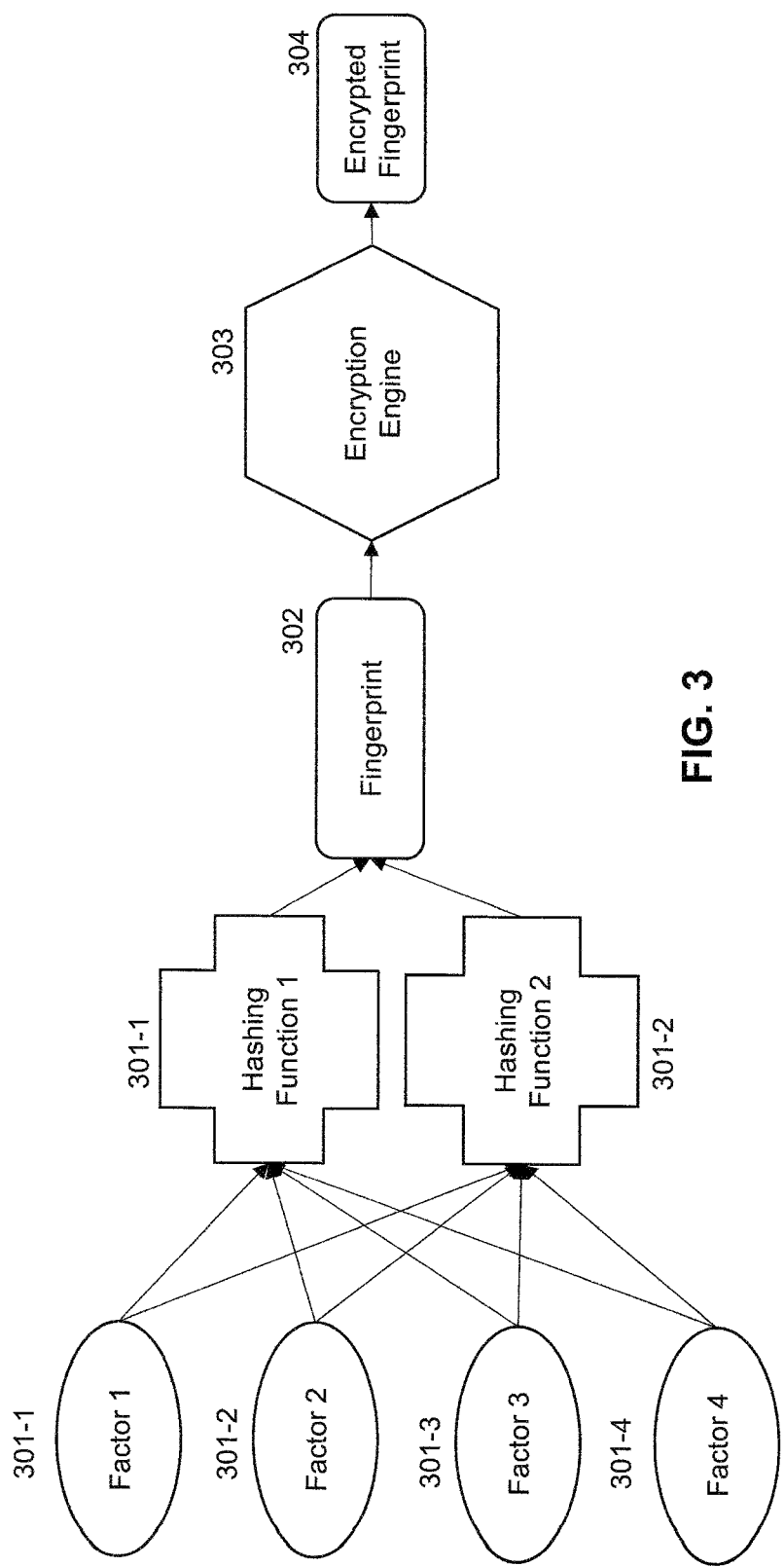
FIG. 3 is a block diagram of an embodiment of a method to algorithmically generate a device fingerprint.

FIG. 3 illustrates an algorithmic embodiment of fingerprint generation. In this embodiment, there are four physical factors (Factor 1 301-1, Factor 2 301-2, Factor 3 301-3, Factor 4 301-4) as an example. Only 1 factor is required but multiple may be used. There are two hashing algorithms (Hashing Function 1 302-1 and Hashing Function 2 302-2) each of which generates different unique 512 bit numbers based on the factors 301-1 301-2 301-3 301-4 input to the algorithms. The Fingerprint 303 is the combination of the two hash outputs from Hashing Function 1 302-1 and Hashing Function 2 302-2. The Encryption Engine 304 is used to encrypt the super-hash. The encrypted fingerprint 305 is output from the encryption engine.

The authorization client 103 collects one or more unique physical attributes from a device or a set of random seeds previously provisioned by the central authority and combine them into a fingerprint 303, which is then encrypted with a public key. These attributes may include but are not be limited to items such as Model Number, Motherboard Serial Number, Media Access Control (MAC) Address, Video Card Serial Number, 48-bit or 64-bit Extended Unit Identifier (EUI-48/EUI-64), Wi-Fi Media Access Control (MAC), International Mobile Equipment Identity (IMEI), or Mobile Equipment Identifier (MEID) in addition to pre-populated seeds generated by the Central Authority.

Each time the fingerprint 305 is requested from a service, the fingerprint engine FIG. 3 reads the required factors 301-1/2/3/4 or seeds, combines them and create two unique checksums 302-1/2 that are combined according to instructions from the central authority 105 and then encrypted 304 with a public key associated with that user. That final fingerprint is then sent to the Central Authority 105 and compared against a key generated from Central Authority 105 records. There is no persistent store of the fingerprint 303/305 at any time. Local copies are destroyed as they are processed.

FIGS. 4-7 are directed to exemplary methods. Aspects of components and functions described above may be utilized in the method steps described below. Where appropriate, reference may be made to previously described components and systems that may be used in carrying out each step. These references are for illustration, and are not intended to limit the possible ways of carrying out any particular step of the method. These flowcharts illustrate operations or steps performed by respective embodiments, and may not recite the complete process or all steps of the method. Although various steps are described below and depicted in the figures, the steps need not necessarily all be performed, and in some cases may be performed in a different order than the order shown.

Figure 4:
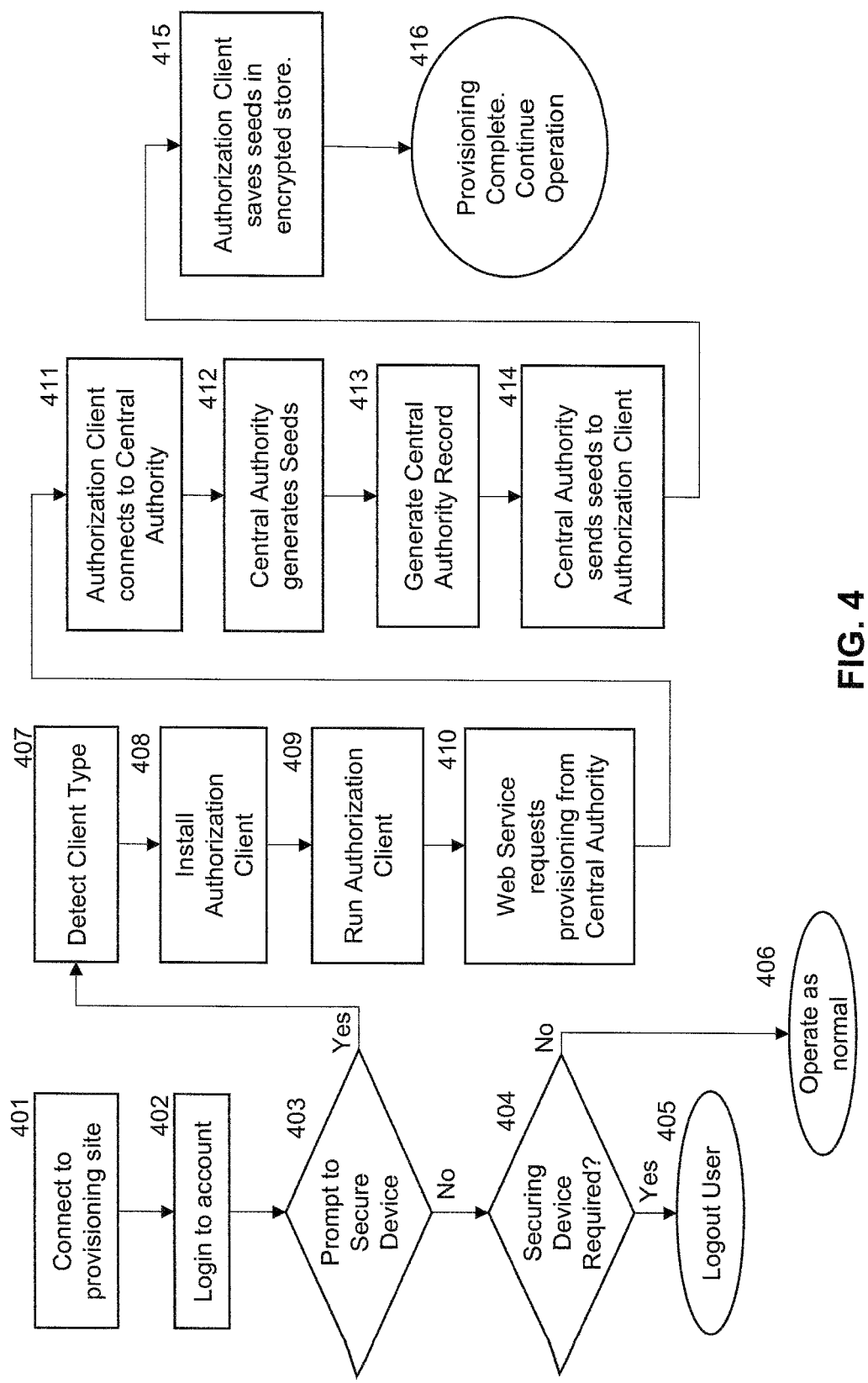
FIG. 4 is an illustration of operations performed by an embodiment of a provisioning model where a client device is provisioned with a client service and enabled for use.

FIG. 4 illustrates an embodiment of a provisioning operation that can be done either on demand in some applications such as registering a client device 101 with a banking website or on-premises in the case of corporate device provisioning. In the general sense, the provisioning operation consists of: Connect to a provisioning site where the user connects to a site for which they want to provision their device to use this method 401; Login to account is the act of using a username and password to authenticate a connection 402; Detect client type is an operation where the provisioning site queries the client device for its type: laptop, smart phone, tablet or other device along with information on the operating system and other necessary information 407; Download the client is the operation to place a copy of the fingerprint client and other utilities appropriate to the client's configuration on the client device 408; Run the Client is the operation of executing the fingerprint software on the client 409; the web service 101 requests device provisioning from the central authority 105 410; the authorization client 103 connects to the central authority 105 411; the central authority 105 generates seeds for this client device and username combination 412; the central authority 105 generates a record for this entry with appropriate metadata 413;

the central authority 105 sends the seeds to the authorization client 103 414; the authorization client 103 saves and encrypts these seeds locally 415; the user proceeds to operate normally 416.

Figure 5:
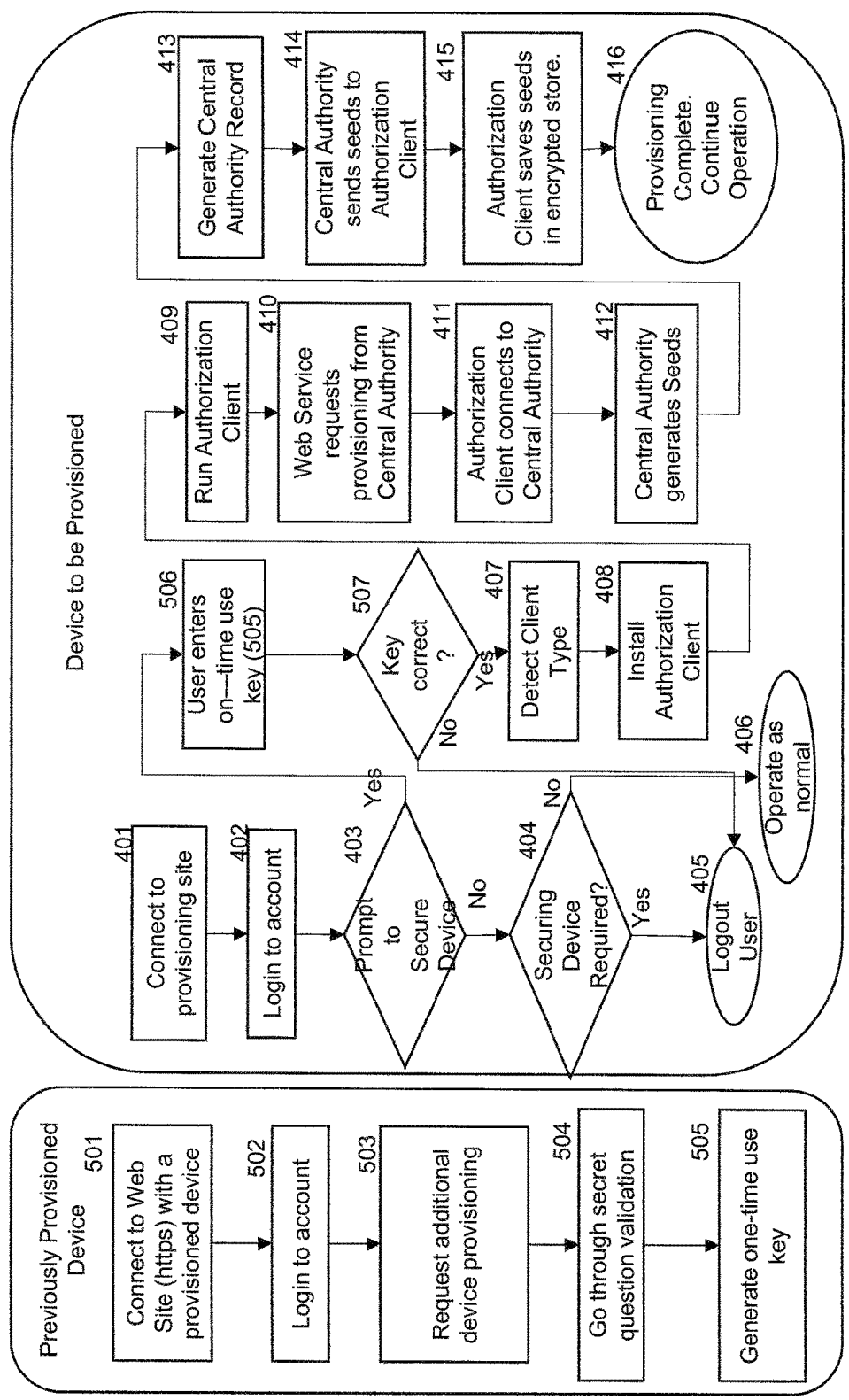
FIG. 5 is an illustration of operations performed by an embodiment of a provisioning model where a second client device is provisioned and enabled with the client service while maintaining credential security.

Referring to FIG. 5, an embodiment of an Incremental Self-Provisioning process is illustrated. In some embodiments of the method, the deployment may allow users to self-provision multiple client devices 101. Allowing an incremental provisioning event without two-factor authentication obviates the benefit of the method. Therefor access to an already provisioned client device 101 is required.

The steps in the Incremental Self-Provisioning process are:
  On the already secured client device 101: Connect to a Provisioning Site is an action by the user connects to a site for which they want to provision their device to use this method 501; Login to Account is the act of the user to submit a username and password to authenticate a connection 502; Request Additional Device Pairing is an action by the user to initiate the pairing 503; Go Through Secret Question Validation is an action by the networked resource where the user is validated through the use of personal information 504; and Generate One-time Key is an action by the provisioning system where a single-use code is generated to enable the provisioning process 505.
  On the to be provisioned client device 101: execute the process described in FIG. 4 above: Connect to a provisioning site where the user connects to a site for which they want to provision their device to use this method 401; Login to account is the act of using a username and password to authenticate a connection 402; The user is then prompted to secure the device 403; If the user declines, the web service verifies unprovisioned devices can be used 404; If unprovisioned devices are not supported, the connection is terminated 405; If the user has selected to provision the devices they are prompted for and enter 506 the single-use key 505; the service validates the one-time use key 507; if the key is not valid, the connection is terminated 405; if the key is valid, the service detects the client type is an operation where the provisioning site queries the client device for its type: laptop, smart phone, tablet or other device along with information on the operating system and other necessary information 407; Download the client is the operation to place a copy of the fingerprint client and other utilities appropriate to the client's configuration on the client device 408; Run the Client is the operation of executing the fingerprint software on the client 409; the web service 101 requests device provisioning from the central authority 105 410; the authorization client 103 connects to the central authority 105 411; the central authority 105 generates seeds for this client device and username combination 412; the central authority 105 generates a record for this entry with appropriate metadata 413; the central authority 105 sends the seeds to the authorization client 103 414; the authorization client 103 saves and encrypts these seeds locally 415; and the user proceeds to operate normally 416.

Referring to FIG. 6, an embodiment of the authentication process in the previously described embodiments is illustrated. The method essentially embeds 2 factor authentications into any connection by associating a device fingerprint 304 with a specific username and enforces a hard association of user credentials 602 with client device 101. In summary, a connection is authenticated by comparing the device fingerprint 304 and username 602 with the Central Authority database to validate that association if the username/password 304 combination is valid. A connection failure may be handled either silently or with a message that this username is not valid on the requesting client device 101.

The authentication process is: a connection is opened to a web server which requires username/password authentication 601. The user supplies their username and password credentials 602. The username and password combination 602 are validated against internal records 603/604; a check is made to see if the username is associated with fingerprinted devices 605. In the event that it is not associated 605, if fingerprinted devices are required 609, the connection is terminated 611. If they are not required, then the connection is established 610. If the username is associated with a fingerprinted device, the web service 104 requests device validation by the central authority 105. The central authority 105 requests the fingerprint 304 from the client device 101 606, the authorization client 103 generates and encrypts it sends it to the central authority 103 608. At this point, the Central Authority 103 validates the fingerprint 305 is associated with a client device 101 where the credentials 602 are valid for that web service 104. If the association is confirmed the connection becomes active 610. If not, the connection is terminated 611.

Referring to FIG. 7, an embodiment of a Device De-Provisioning method is illustrated. The Device De-Provisioning method disables the ability to connect with a web service 104 for a specific set of client device or devices 101. This de-provisioning is done simply by removing the association between the username 602 and the fingerprint 304 and seeds 301-1/2/3/4 records on the Central Authority 105. Once the fingerprint 304 has been removed, that username no longer functions on the associated client device 101 for the associated web service 104.

The steps and operations to de-provision a device ore account are: Login to Central Authority Management Console 701; Enter the User ID for the client device 101 702; Retrieve the list of associated devices 703; Select the device or devices to de-provision 704; and Delete Device Record or Shred Encryption Key 705.

Figure 8:
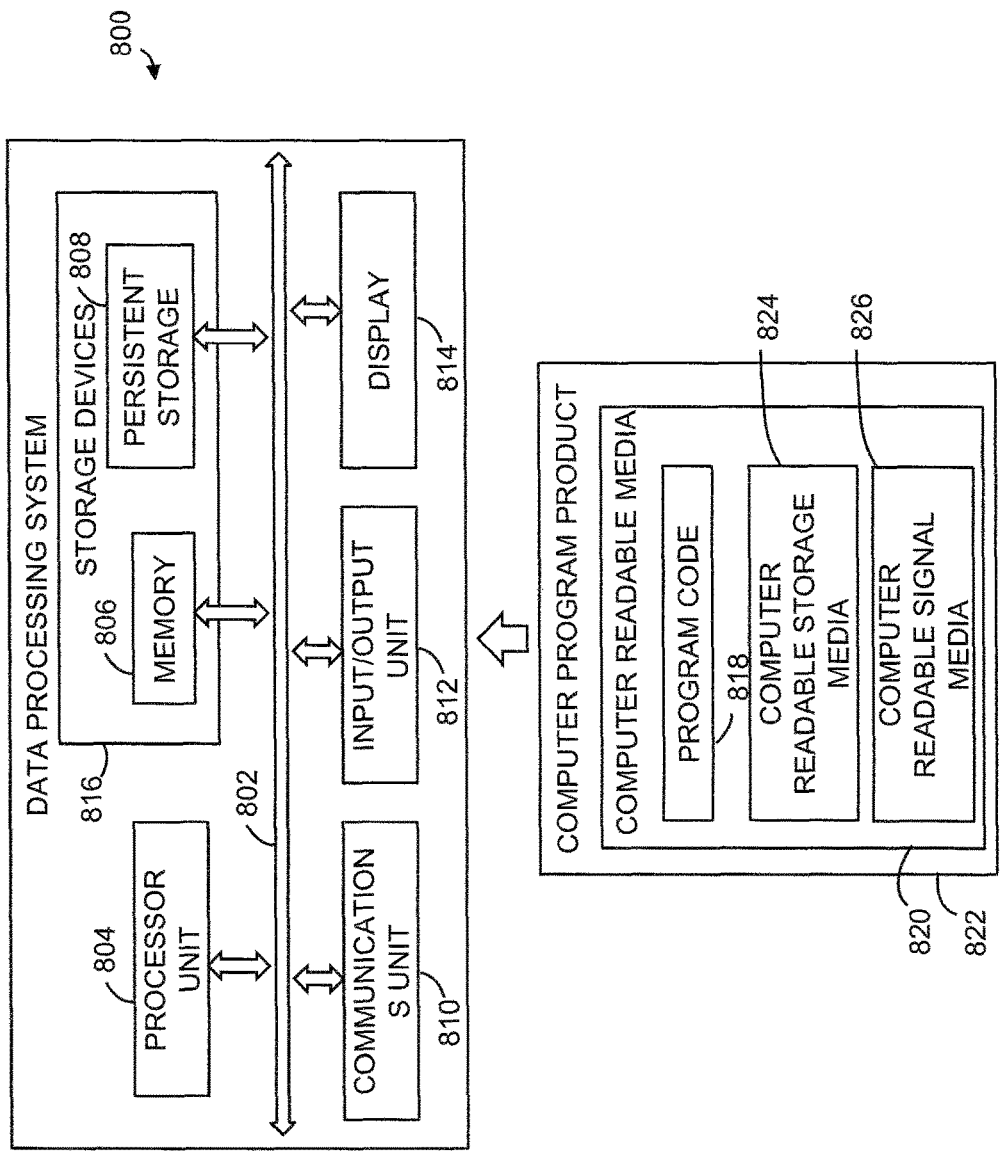
FIG. 8 is a schematic diagram of various components of an illustrative data processing system.

As shown in FIG. 8, this example describes a data processing system 800 in accordance with aspects of the present disclosure. In this example, data processing system 800 is an illustrative data processing system suitable for implementing aspects of device based user authentication. More specifically, in some examples, devices that are embodiments of data processing systems (e.g., smartphones, tablets, personal computers) may be devices used in a device based user authentication system or method.

In this illustrative example, data processing system 800 includes communications framework 802. Communications framework 802 provides communications between processor unit 804, memory 806, persistent storage 808, communications unit 810, input/output (I/O) unit 812, and display 814. Memory 806, persistent storage 808, communications unit 810, input/output (I/O) unit 812, and display 814 are examples of resources accessible by processor unit 804 via communications framework 802.

Processor unit 804 serves to run instructions that may be loaded into memory 806. Processor unit 804 may be a number of processors, a multi-processor core, or some other type of processor, depending on the particular implementation. Further, processor unit 804 may be implemented using a number of heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device is any piece of hardware that is capable of storing information, such as, for example, without limitation, data, program code in functional form, and other suitable information either on a temporary basis or a permanent basis.

Storage devices 816 also may be referred to as computer-readable storage devices in these examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these examples, provides for communications with other data processing systems or devices. In these examples, communications unit 810 is a network interface card. Communications unit 810 may provide communications through the use of either or both physical and wireless communications links.

Input/output (I/O) unit 812 allows for input and output of data with other devices that may be connected to data processing system 800. For example, input/output (I/O) unit 812 may provide a connection for user input through a keyboard, a mouse, and/or some other suitable input device. Further, input/output (I/O) unit 812 may send output to a printer. Display 814 provides a mechanism to display information to a user.

Instructions for the operating system, applications, and/or programs may be located in storage devices 816, which are in communication with processor unit 804 through communications framework 802. In these illustrative examples, the instructions are in a functional form on persistent storage 808. These instructions may be loaded into memory 806 for execution by processor unit 804. The processes of the different embodiments may be performed by processor unit 804 using computer-implemented instructions, which may be located in a memory, such as memory 806.

These instructions are referred to as program instructions, program code, computer usable program code, or computer-readable program code that may be read and executed by a processor in processor unit 804. The program code in the different embodiments may be embodied on different physical or computer-readable storage media, such as memory 806 or persistent storage 808.

Program code 818 is located in a functional form on computer-readable media 820 that is selectively removable and may be loaded onto or transferred to data processing system 800 for execution by processor unit 804. Program code 818 and computer-readable media 820 form computer program product 822 in these examples. In one example, computer-readable media 820 may be computer-readable storage media 824 or computer-readable signal media 826.

Computer-readable storage media 824 may include, for example, an optical or magnetic disk that is inserted or placed into a drive or other device that is part of persistent storage 808 for transfer onto a storage device, such as a hard drive, that is part of persistent storage 808. Computer-readable storage media 824 also may take the form of a persistent storage, such as a hard drive, a thumb drive, or a flash memory, that is connected to data processing system 800. In some instances, computer-readable storage media 824 may not be removable from data processing system 800.

In these examples, computer-readable storage media 824 is a physical or tangible storage device used to store program code 818 rather than a medium that propagates or transmits program code 818. Computer-readable storage media 824 is also referred to as a computer-readable tangible storage device or a computer-readable physical storage device. In other words, computer-readable storage media 824 is non-transitory.

Alternatively, program code 818 may be transferred to data processing system 800 using computer-readable signal media 826. Computer-readable signal media 826 may be, for example, a propagated data signal containing program code 818. For example, computer-readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 818 may be downloaded over a network to persistent storage 808 from another device or data processing system through computer-readable signal media 826 for use within data processing system 800. For instance, program code stored in a computer-readable storage medium in a server data processing system may be downloaded over a network from the server to data processing system 800. The data processing system providing program code 818 may be a server computer, a client computer, or some other device capable of storing and transmitting program code 818.

The different components illustrated for data processing system 800 are not meant to provide architectural limitations to the manner in which different embodiments may be implemented. The different illustrative embodiments may be implemented in a data processing system including components in addition to and/or in place of those illustrated for data processing system 800. Other components shown in FIG. 8 can be varied from the illustrative examples shown. The different embodiments may be implemented using any hardware device or system capable of running program code. As one example, data processing system 800 may include organic components integrated with inorganic components and/or may be comprised entirely of organic components excluding a human being. For example, a storage device may be comprised of an organic semiconductor.

In another illustrative example, processor unit 804 may take the form of a hardware unit that has circuits that are manufactured or configured for a particular use. This type of hardware may perform operations without needing program code to be loaded into a memory from a storage device to be configured to perform the operations.

For example, when processor unit 804 takes the form of a hardware unit, processor unit 804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 818 may be omitted, because the processes for the different embodiments are implemented in a hardware unit.

In still another illustrative example, processor unit 804 may be implemented using a combination of processors found in computers and hardware units. Processor unit 804 may have a number of hardware units and a number of processors that are configured to run program code 818. With this depicted example, some of the processes may be implemented in the number of hardware units, while other processes may be implemented in the number of processors.

In another example, a bus system may be used to implement communications framework 802 and may be comprised of one or more buses, such as a system bus or an input/output bus. Of course, the bus system may be implemented using any suitable type of architecture that provides for a transfer of data between different components or devices attached to the bus system.

Additionally, communications unit 810 may include a number of devices that transmit data, receive data, or both transmit and receive data. Communications unit 810 may be, for example, a modem or a network adapter, two network adapters, or some combination thereof. Further, a memory may be, for example, memory 806, or a cache, such as that found in an interface and memory controller hub that may be present in communications framework 802.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

Figure 9:
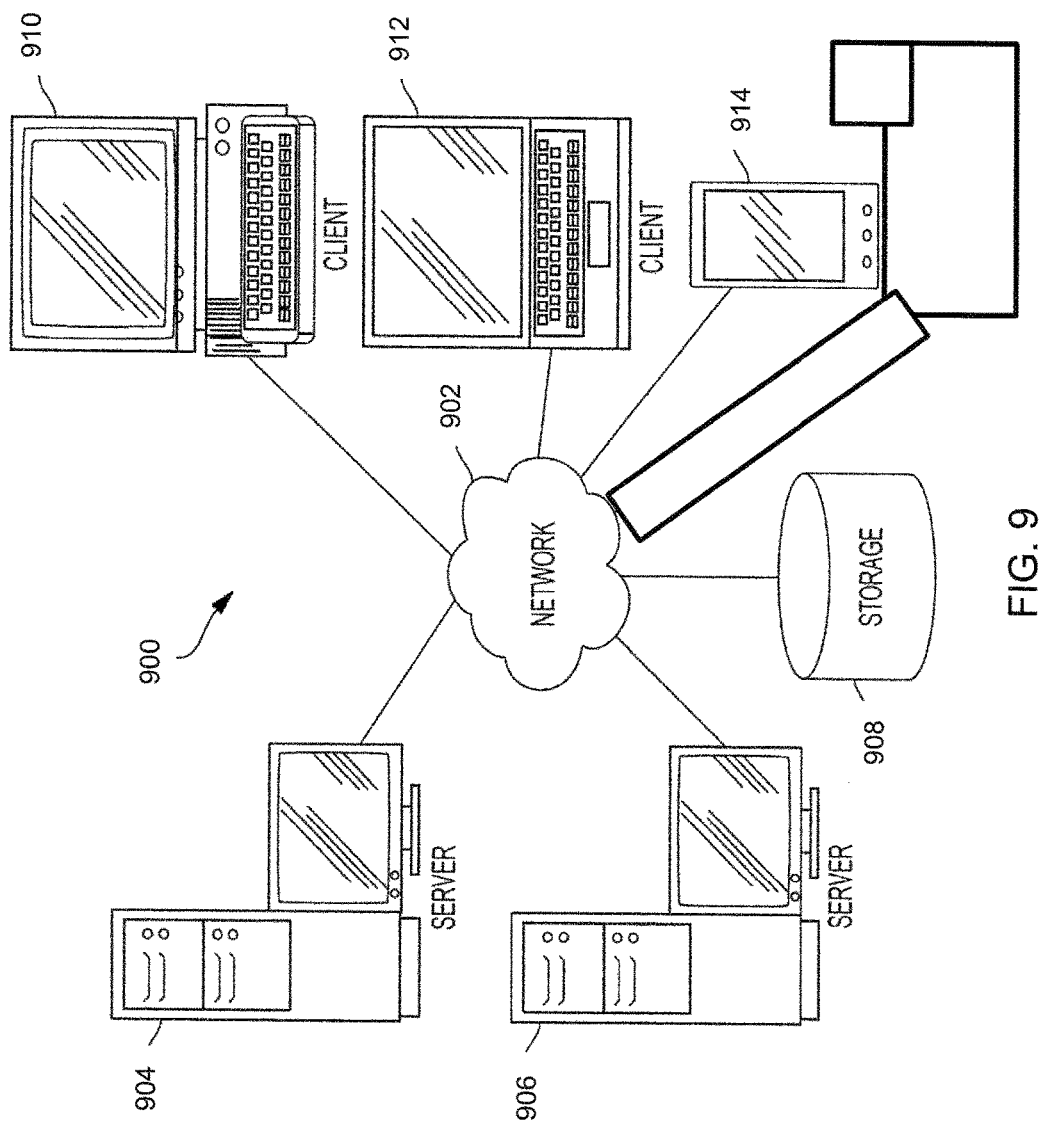
FIG. 9 is a schematic representation of an illustrative computer network system.

As shown in FIG. 9, this example describes a general network data processing system 900, interchangeably termed a network, a computer network, a network system, or a distributed network, aspects of which may be included in one or more illustrative embodiments of device based user authentication. For example, as discussed above, components of a device based user authentication system communicate over a network. It should be appreciated that FIG. 9 is provided as an illustration of one implementation and is not intended to imply any limitation with regard to environments in which different embodiments may be implemented. Many modifications to the depicted environment may be made.

Network data processing system 900 is a network of computers, each of which is an example of data processing system 800, and other components. Network data processing system 900 may include network 902, which is a medium configured to provide communications links between various devices and computers connected together within network data processing system 900. Network 902 may include connections such as wired or wireless communication links, fiber optic cables, and/or any other suitable medium for transmitting and/or communicating data between network devices, or any combination thereof.

In the depicted example, a first network device 904 and a second network device 906 connect to network 902, as does an electronic storage device 908. Network devices 904 and 906 are each examples of data processing system 800, described above. In the depicted example, devices 904 and 906 are shown as server computers. However, network devices may include, without limitation, one or more personal computers, mobile computing devices such as personal digital assistants (PDAs), tablets, and smart phones, handheld gaming devices, wearable devices, tablet computers, routers, switches, voice gates, servers, electronic storage devices, imaging devices, and/or other networked-enabled tools that may perform a mechanical or other function. These network devices may be interconnected through wired, wireless, optical, and other appropriate communication links.

In addition, client electronic devices, such as a client computer 910, a client laptop or tablet 912, and/or a client smart device 914, may connect to network 902. Each of these devices is an example of data processing system 800, described above regarding FIG. 8. Client electronic devices 910, 912, and 914 may include, for example, one or more personal computers, network computers, and/or mobile computing devices such as personal digital assistants (PDAs), smart phones, handheld gaming devices, wearable devices, and/or tablet computers, and the like. In the depicted example, server 904 provides information, such as boot files, operating system images, and applications to one or more of client electronic devices 910, 912, and 914. Client electronic devices 910, 912, and 914 may be referred to as "clients" with respect to a server such as server computer 904. Network data processing system 900 may include more or fewer servers and clients or no servers or clients, as well as other devices not shown.

Client smart device 914 may include any suitable portable electronic device capable of wireless communications and execution of software, such as a smartphone or a tablet. Generally speaking, the term "smartphone" may describe any suitable portable electronic device having more advanced computing ability and network connectivity than a typical mobile phone. In addition to making phone calls (e.g., over a cellular network), smartphones may be capable of sending and receiving emails, texts, and multimedia messages, accessing the Internet, and/or functioning as a web browser. Smartdevices (e.g., smartphones) may also include features of other known electronic devices, such as a media player, personal digital assistant, digital camera, video camera, and/or global positioning system. Smartdevices (e.g., smartphones) may be capable of connecting with other smartdevices, computers, or electronic devices wirelessly, such as through near field communications (NFC), BLUETOOTH®, WiFi, or mobile broadband networks. Wireless connectively may be established among smartdevices, smartphones, computers, and other devices to form a mobile network where information can be exchanged.

Program code located in system 900 may be stored in or on a computer recordable storage medium, such as persistent storage 808 in FIG. 8, and may be downloaded to a data processing system or other device for use. For example, program code may be stored on a computer recordable storage medium on server computer 904 and downloaded for use to client 910 over network 902 for use on client 910.

Network data processing system 900 may be implemented as one or more of a number of different types of networks. For example, system 900 may include an intranet, a local area network (LAN), a wide area network (WAN), or a personal area network (PAN). In some examples, network data processing system 900 includes the Internet, with network 902 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. FIG. 9 is intended as an example, and not as an architectural limitation for any illustrative embodiments.

This section describes additional aspects and features of device based user authentication, presented without limitation as a series of paragraphs. Each of these paragraphs can be combined with one or more other paragraphs, and/or with disclosure from elsewhere in this application. Some of the paragraphs below expressly refer to and further limit other paragraphs, providing without limitation examples of some of the suitable combinations.

In some embodiments, a method of preventing the use of stolen or lost Web-based service credentials may include hosting by a host computer device on a computer network a unique session of an application using a Web-based service and running on a user computer device; creating a unique session id for each connection attempt by a user on a user computer device included in a computer network; receiving from a user on the user computer device a username and password; authenticating the user in an authentication system; requesting, on the server of an Internet-based authentication service provider, access to a central authority authorized to validate the authentication of the user by the received username from the host computer device; generating an algorithm for a unique combination of unique, rotating seeds and certificates selected from a database of seeds and certificates stored on a web-based data base at the central authority; delivering the algorithm to the user computer device; generating a validation token on the user computer device using the delivered algorithm; sending the validation token to the central authority for confirmation; determining by the central authority whether or not the generated validation token is correct; notifying by the central authority the Web-based service as to whether the authentication attempt is valid or invalid; updating, by the central authority, a key or set of keys on the user computer device from a set of unique, rotating keys stored on the user computer device; and denying access by the user computer device access to the Web-based service if the authentication attempt is invalid.

In some examples a method may further include, if the authentication attempt is invalid, logging, by the central authority, the connection attempt as invalid.

Also, in some examples, a method may further include, if the authentication attempt is invalid, notifying the user, using a push mechanism, of a connection attempt from the user computer device using invalid unique, rotating seeds and certificates.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

What is claimed is:

1. A method of preventing the use of stolen or lost Web-based service credentials, said method comprising:
   hosting by a host computer device on a computer network a unique session of an application using a Web-based service and running on a user computer device;
   creating a unique session id for each connection attempt by a user on a user computer device included in a computer network;
   receiving from a user on the user computer device a username and password;
   authenticating the user in an authentication system;
   requesting, on the server of an Internet-based authentication service provider, access to a central authority authorized to validate the authentication of the user by the received username from the host computer device;
   generating an algorithm for a unique combination of unique, rotating seeds and certificates selected from a database of seeds and certificates stored on a web-based data base at the central authority;
   delivering the algorithm to the user computer device;
   generating a validation token on the user computer device using the delivered algorithm;
   sending the validation token to the central authority for confirmation;
   determining by the central authority whether or not the generated validation token is correct;
   notifying by the central authority the Web-based service as to whether the authentication attempt is valid or invalid;
   updating, by the central authority, a key or set of keys on the user computer device from a set of unique, rotating keys stored on the user computer device; and
   denying access by the user computer device access to the Web-based service if the authentication attempt is invalid.

2. The method of claim 1, further comprising, if the authentication attempt is invalid, logging, by the central authority, the connection attempt as invalid.

3. The method of claim 2, further comprising, if the authentication attempt is invalid, notifying the user, using a push mechanism, of a connection attempt from the user computer device using invalid unique, rotating seeds and certificates.

\* \* \* \* \*